(12) United States Patent
Schwarz et al.

(10) Patent No.: US 12,519,370 B2
(45) Date of Patent: Jan. 6, 2026

(54) VARIABLE-SPEED TRIGGER SWITCH HAVING A CONDUCTIVE ELASTOMER

(71) Applicant: Black & Decker Inc., New Britain, CT (US)

(72) Inventors: Daniel L. Schwarz, Timonium, MD (US); Matthew J. Lazzaro, Forest Hill, MD (US); Tal Gottesman, Lutherville, MD (US); Geoffrey S. Howard, Columbia, MD (US); Michael P. Sikora, Baltimore, MD (US); Kristian B. Sims, Towson, MD (US)

(73) Assignee: BLACK & DECKER INC., New Britain, CT (US)

( * ) Notice: Subject to any disclaimer, the term of this patent is extended or adjusted under 35 U.S.C. 154(b) by 631 days.

(21) Appl. No.: 17/749,247

(22) Filed: May 20, 2022

(65) Prior Publication Data

US 2022/0376584 A1 Nov. 24, 2022

Related U.S. Application Data

(60) Provisional application No. 63/190,991, filed on May 20, 2021.

(51) Int. Cl.
*H02K 7/14* (2006.01)
*B25F 5/02* (2006.01)
(Continued)

(52) U.S. Cl.
CPC .............. *H02K 7/145* (2013.01); *B25F 5/02* (2013.01); *C08K 3/04* (2013.01); *C08K 3/08* (2013.01);
(Continued)

(58) Field of Classification Search
CPC .... B25F 5/02; B25F 5/00; H01H 1/14; H01H 1/06; H01H 9/061; H01H 2201/036;
(Continued)

(56) References Cited

U.S. PATENT DOCUMENTS 3,693,059 A 9/1972 Harris
4,599,496 A 7/1986 Lecklider
(Continued)

FOREIGN PATENT DOCUMENTS

CN 1750200 A 3/2006
EP 2431987 A2 3/2012
(Continued)

OTHER PUBLICATIONS

EP EESR dated, Jan. 2, 2023, in corresponding EP application No. 22174537.5.

*Primary Examiner* — Alex W Mok
(74) *Attorney, Agent, or Firm* — Amir R. Rohani

(57) ABSTRACT

Systems, methods and apparatuses provide for technology that includes a motor, a trigger assembly including a trigger member and an elastomer member mechanically coupled to the trigger member and moveable along a movement axis, wherein the elastomer member includes an electrically-conductive non-planar surface, a controller configured to operate the motor, and a circuit board oriented substantially perpendicularly to the movement axis, the circuit board including a plurality of conductive tracks facing the non-planar surface coupled to a resistor divider, and wherein controller is configured to vary a speed of the motor based on a number of the plurality of conductive tracks contacted by the non-planar surface of the elastomer member. The elastomer member may include a non-planar surface having a conductive central region, a conductive peripheral region (Continued)

and an insulative region positioned between the conductive central region and the conductive peripheral region.

15 Claims, 20 Drawing Sheets

(51) Int. Cl.
    *C08K 3/04*           (2006.01)
    *C08K 3/08*           (2006.01)

(52) U.S. Cl.
    CPC .... *C08K 2201/001* (2013.01); *H02K 2203/03* (2013.01); *H02K 2211/03* (2013.01)

(58) Field of Classification Search
    CPC ......... H01H 2201/032; H01H 2203/02; H02K 7/145; H02K 2211/03; H02K 2203/03; C08K 3/08; C08K 3/04; C08K 2201/001
    USPC ......................................................... 310/50
    See application file for complete search history.

(56) References Cited

U.S. PATENT DOCUMENTS

| | | | | |
|---|---|---|---|---|
| 5,365,155 A | | 11/1994 | Zimmerman | |
| 5,949,325 A | * | 9/1999 | Devolpi | G05G 9/047 338/68 |
| 6,906,700 B1 | * | 6/2005 | Armstrong | G05G 9/04737 345/161 |
| 6,958,614 B2 | * | 10/2005 | Morimoto | G01L 5/165 324/661 |
| 7,684,953 B2 | * | 3/2010 | Feist | H01C 10/12 702/139 |
| 8,047,083 B2 | * | 11/2011 | Puzio | B25F 5/02 73/862.21 |
| 9,081,426 B2 | * | 7/2015 | Armstrong | G06F 3/016 |
| 9,160,261 B2 | * | 10/2015 | Nishikimi | H01H 15/16 |
| 9,444,307 B2 | * | 9/2016 | Watanabe | H01H 9/061 |
| 10,043,619 B2 | * | 8/2018 | Ekstrom | H05K 1/115 |
| 10,373,775 B2 | * | 8/2019 | Ito | H01H 13/48 |
| 10,403,451 B2 | | 9/2019 | Ito et al. | |
| 10,491,211 B2 | | 11/2019 | Dey, IV et al. | |
| 10,493,614 B2 | * | 12/2019 | Tsutsui | G01L 1/2281 |
| 10,497,524 B2 | * | 12/2019 | Ekstrom | H01H 21/12 |
| 10,541,588 B2 | * | 1/2020 | Wachter | B25F 5/00 |
| 10,894,311 B2 | | 1/2021 | Yamashita | |
| 2003/0222660 A1 | * | 12/2003 | Morimoto | G01L 1/142 324/661 |
| 2013/0093679 A1 | * | 4/2013 | Dickinson | G06F 3/0393 345/168 |
| 2017/0144290 A1 | * | 5/2017 | Tsutsui | B25F 5/00 |
| 2017/0144291 A1 | * | 5/2017 | Tsutsui | B25F 5/00 |
| 2019/0235637 A1 | * | 8/2019 | Deily | H01H 13/85 |
| 2020/0111633 A1 | * | 4/2020 | Schautzgy | H01H 71/145 |
| 2020/0219658 A1 | | 7/2020 | Beilker et al. | |
| 2021/0111611 A1 | | 4/2021 | Wong | |

FOREIGN PATENT DOCUMENTS

| | | | | |
|---|---|---|---|---|
| WO | 1999009572 A1 | | 2/1999 | |
| WO | WO-9909572 A1 | * | 2/1999 | ........... H01H 13/702 |
| WO | WO-2011007500 A1 | * | 1/2011 | ............. H01H 13/78 |

* cited by examiner

-Prior Art-

VARIABLE-SPEED TRIGGER SWITCH HAVING A CONDUCTIVE ELASTOMER

CROSS-REFERENCE TO RELATED APPLICATIONS

This application claims the benefit of priority to U.S. Provisional Patent Application No. 63/190,991, filed on May 20, 2021, incorporated herein by reference in its entirety.

FIELD

This application relates to a trigger switch for a power tool, and in particular to a compact trigger switch including a conductive elastomer.

BACKGROUND

US Patent Pub. No. 2015/0280515, filed Mar. 30, 2015, content of which is incorporated herein by reference in its entirety, describes an integrated switch and control module for driving a brushless DC (BLDC) motor in a power tool. This module, in an embodiment, includes a planar circuit board that accommodates a controller, a series of power switches configured as a three-phase inverter circuit, a series of corresponding heat sinks mounted on the power switches, and an input unit coupled to a trigger. An input unit that in part includes a trigger switch is mounted on the switch and control module. The trigger switch includes a plunger that carries a wiper. As the trigger switch is moved along its axis, the wiper slides over a potentiometer and a series of conductive tracks.

As power tools are becoming more compact and demand higher power density, compactness and efficiency of various tool components, including the input unit and the trigger assembly, becomes more important. This disclosure addresses the need for a compact and efficient trigger assembly that meets the size requirements of modern power tools.

This section provides background information related to the present disclosure and is not necessarily prior art.

SUMMARY

This section provides a general summary of the disclosure, and is not a comprehensive disclosure of its full scope or all of its features.

An apparatus comprising: a motor; an input unit including a trigger member and an elastomer member mechanically coupled to the trigger member and moveable along a movement axis, wherein the elastomer member comprises semi-conductive elastically-deformable material and includes a non-planar surface; a controller configured to operate the motor; and a circuit board oriented substantially perpendicularly to the movement axis, the circuit board having a plurality of conductive tracks positioned facing the non-planar surface of the elastomer member, wherein the plurality of conductive tracks include a sense node and a supply node, and wherein the controller is configured to vary a speed of the motor based on an amount of surface area contact between the elastomer member, the sense node, and the supply node.

An apparatus comprising: a motor; a trigger assembly including a trigger member and an elastomer member mechanically coupled to the trigger member and moveable along a movement axis, wherein the elastomer member includes an electrically-conductive non-planar surface; a controller configured to operate the motor; and a circuit board oriented substantially perpendicularly to the movement axis, the circuit board including a plurality of conductive tracks facing the non-planar surface coupled to a resistor divider, and wherein controller is configured to vary a speed of the motor based on a number of the plurality of conductive tracks contacted by the non-planar surface of the elastomer member.

DRAWINGS

The various advantages of the embodiments will become apparent to one skilled in the art by reading the following specification and appended claims, and by referencing the following drawings, in which:

Corresponding reference numerals indicate corresponding parts throughout the several views of the drawings.

DESCRIPTION

Example embodiments will now be described more fully with reference to the accompanying drawings.

Figure 1:
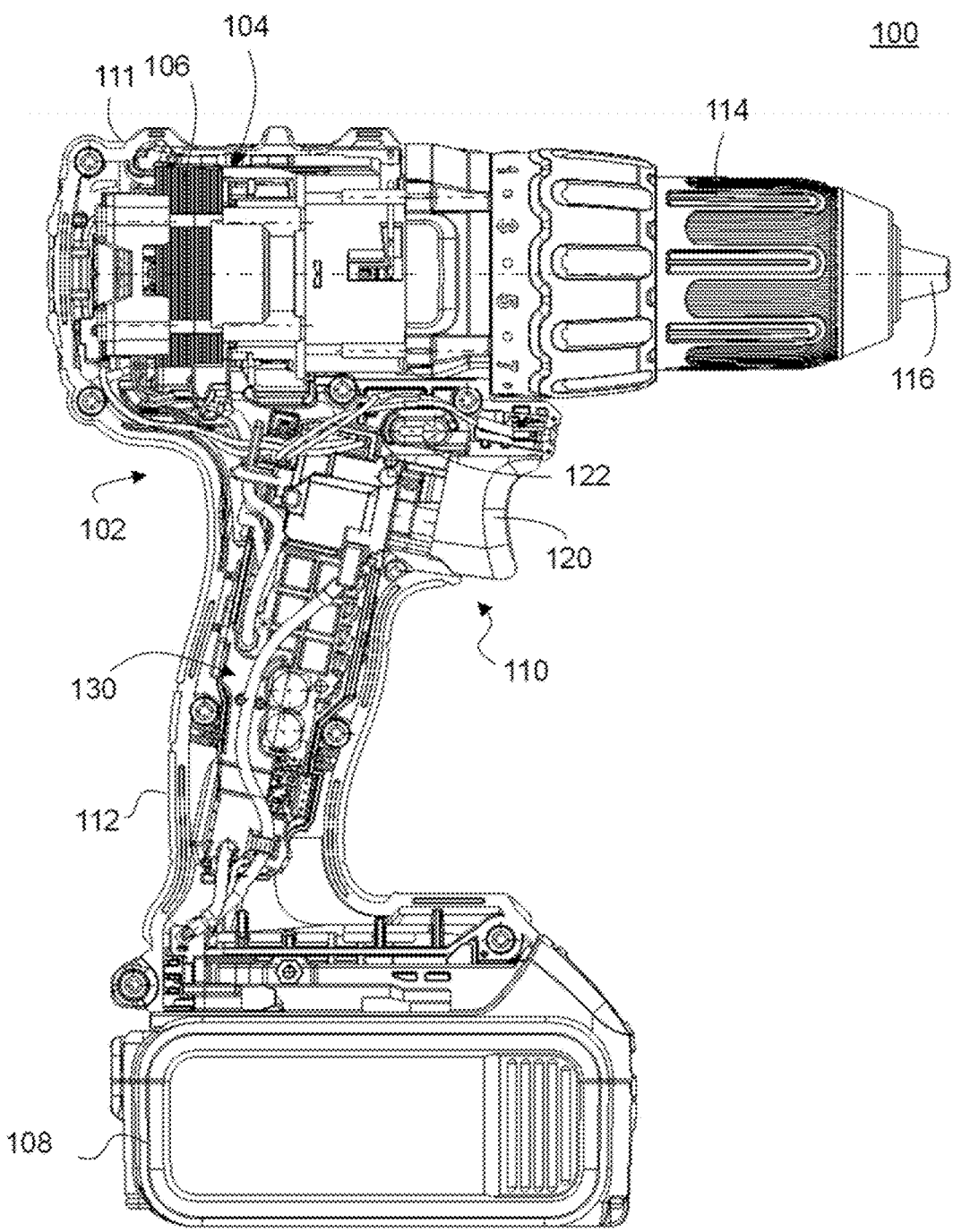
FIG. 1 is a sectional side view of an example of a power tool according to an embodiment.

With reference to the FIG. 1, a power tool 100 constructed in accordance with the teachings of the present disclosure is illustrated in a longitudinal cross-section view. Power tool 100 in the particular example provided may be a hand-held dill, but it will be appreciated that the teachings of this disclosure is merely exemplary, and the power tool of this invention could be any power tool. The power tool shown in FIG. 1 may include a housing 102, an electric motor 104, a battery receptacle for receiving a removable battery pack 108, a gear case 114 (e.g., transmission assembly), and an output spindle (not shown) driving a chuck 116. The gear case 114 may be removably coupled to the housing 102. The housing 102 can define a motor housing 111 and a handle 112.

According to an embodiment, motor 104 includes a stator 106 received in motor housing 111. Motor 104 maybe be any type of motor and may be powered by an appropriate power source. In an embodiment, the motor is a brushless DC electric motor including stator 106 and a rotor rotatably received within the stator 106 and is powered by battery pack 108.

According to an embodiment of the invention, power tool 100 further includes an electronic control module 130. Electronic control module 130, in an embodiment, may include a programmable controller, such as a microcontroller, and electronic switching components for regulating the supply of power from the battery pack 108 to motor 106. In an embodiment, electronic control module 130 is disposed within the handle 112 below the motor housing 111, though it must be understood that depend on the power tool shape and specifications, electronic control module 130 may be disposed at any location within the power tool. Electronic control module may also integrally include components to support a user-actuated input unit 110 for receiving user functions, such as an on/off signal, variable-speed signal, and forward-reverse signal. In an embodiment, input unit 110 may include a variable-speed trigger 120, although other input mechanism such as a touch-sensor, a capacitive-sensor, a speed dial, etc. may also be utilized. In an embodiment, an on/off signal is generated upon initial actuation of the variable-speed trigger 120. In an embodiment, a forward/reverse button 122 is additionally provided on the tool 100. The forward/reverse button 122 may be pressed on either side of the tool in a forward, locked, or reverse position. In an embodiment, the associated circuitry and components of the input unit 110 that support the variable-speed trigger 120 and the forward/reverse button 122 may be fully or at least partially integrated into the electronic control module 130. Based on the input signals from the input unit 110 and associated components, the controller and electronic switching components of the electronic control module 130 modulate and regulate the supply of power from the battery pack 108 to motor 106. Details of the electronic control module 130 are discussed later in detail.

While in this embodiment, the power source is battery pack 108, it is envisioned that the teachings of this disclosures may be applied to a power tool with an AC power source. Such a power tool may include, for example, a rectifier circuit coupled to the AC power source.

It must be understood that, while FIG. 1 illustrates a power tool drill having a brushless motor, the teachings of this disclosure may be used in any power tool, including, but not limited to, drills, saws, nailers, fasteners, impact wrenches, grinders, sanders, cutters, etc. Also, teachings of this disclosure may be used in any other type of tool or product that include a rotary electric motor, including, but not limited to, mowers, string trimmers, vacuums, blowers, sweepers, edgers, etc.

Figure 2A:
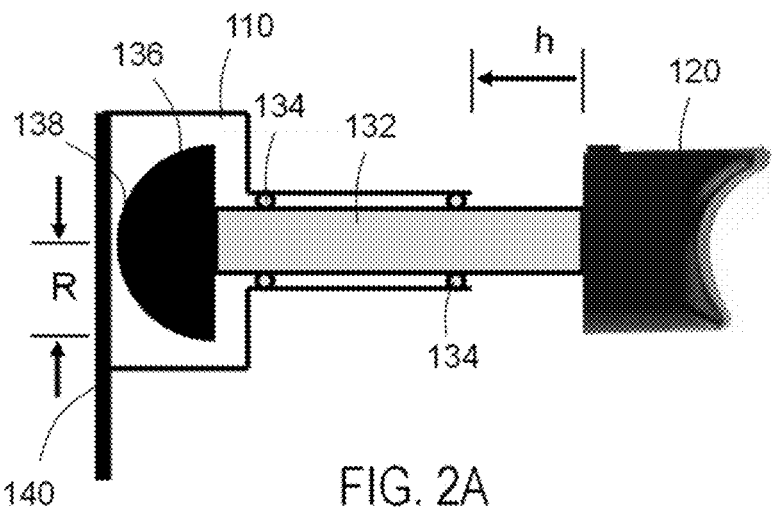
FIGS. 2A-2C are partial side views of an example of an input unit having an elastomer member including a non-planar surface with an arcuate profile, according to an embodiment.
Figure 2B:
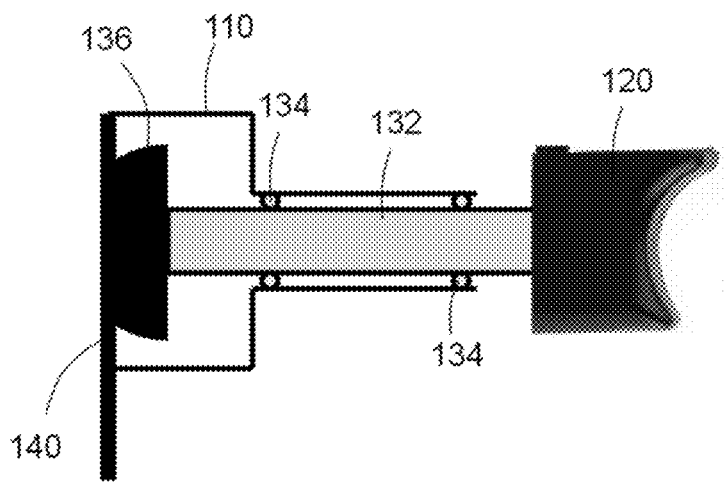
Figure 2C:
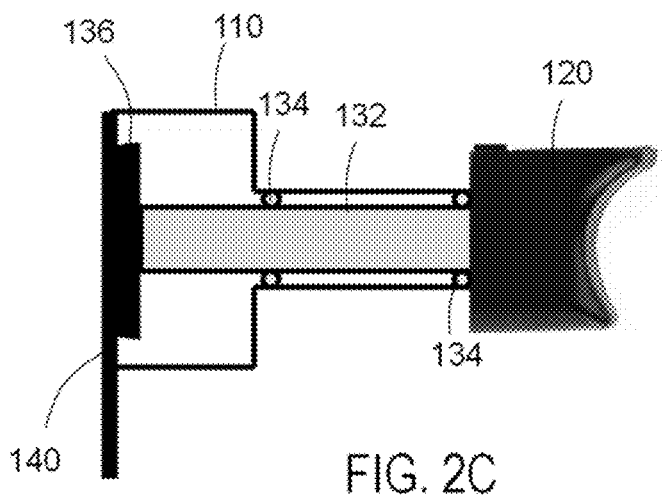

FIGS. 2A through 2C provide partial side views of the input unit 110 as the trigger 120 is pressed, according to an embodiment. In an embodiment, input unit 110 includes a plunger 132 attached to the trigger 120 that moves along its center axis as the trigger 120 is pressed against the tool housing 102. In an embodiment, plunger 132 is radially secured but axially moveable relative to the input unit 110 via two or more annular members 134 secured to a wall or housing of the input unit 110 that allow sliding movement of the plunger 132 relative to the input unit 110.

In an embodiment, an elastic or viscoelastic member 136 such as an elastomer is provided at the end of the plunger 132 opposite the trigger 120. Member 136 is hereinafter referred to as an "elastomer member," and includes a substrate of any material exhibiting elastic or rubber-like properties. Such material includes, but is not limited to, silicone, nitrile, butyl, vulcanized rubber, etc. In an embodiment, elastomer member 136 is provided with a suitable Shore A Hardness (i.e., between 30 to 80) cured with a distributed filling of conductive material. In an embodiment, the fill may include any conductive material, including but not limited to, conductive carbon black, conductive metallic colloid, graphite, conductive metal particles, etc. In an embodiment, the elastomer member 136 is manufactured and cured with a captive matrix of conductive fill, resulting in an elastically flexible elastomer membrane the conductivity of which can be modulated by compression against a surface.

In an embodiment, elastomer member 136 is provided with a non-planar surface 138 facing away from the plunger 132. In this example, the non-planar surface 138 is arcuate or half-spherical, though other non-planar shapes may be similarly utilized as described later. The elastomer member 136 is molded to present any non-planar textured or contoured non-planar surface 138. Non-planar surface 138 is orientated to make contact with a circuit board 140. In an embodiment, circuit board 140 is oriented perpendicularly to the center axis of the plunger 132 and includes conductive tracks that physically contact the non-planar surface 138 of the elastomer member 136 as the trigger 120 is pressed. In an embodiment, elastomer member 136 elastically deforms as it is pressed against the conductive tracks of the circuit board 140.

The shape of the non-planar surface 138 allows a progressive increase in conductivity as measured across the circuit board 140 conductive tracks. Specifically, the further the trigger 120 is pressed, the more the contact surface area of the elastomer member 136 with the circuit board 140 is increased as the void between the circuit board and the elastomer member 136 is filled. This results in an increase in the conductivity of the elastomer member 136 across the circuit board 140 conductive tracks. Additionally, the force applied by the user brings the conductive fill in the elastomer member 136 into closer proximity, enhancing local conductivity of the elastomer material. The combined effect of these allows the elastomer member 136 to replicate the function of a potentiometer, providing a variable speed across the elastomer member 136 that correlates to the travel distance of the trigger 120.

Figure 3:
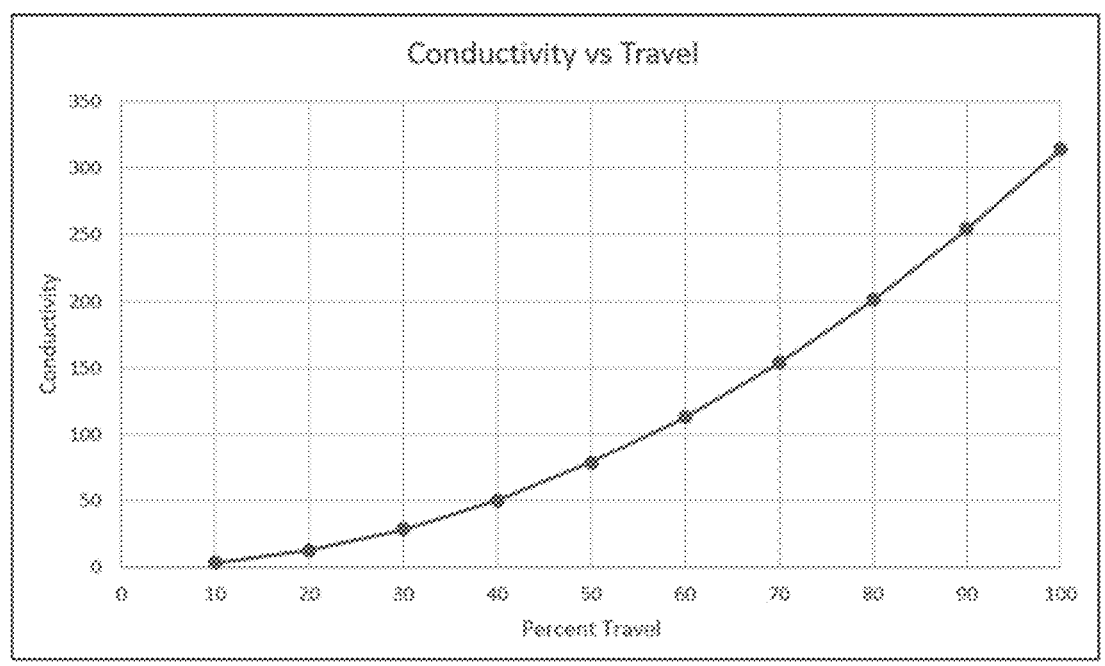
FIG. 3 is a plot of an example of a conductivity chart associated with the elastomer member of FIGS. 2A-2C, according to an embodiment.

FIG. 3 depicts a chart showing the increase in conductivity of the elastomer member 136 as it is pressed against the conductive tracks of the circuit board 140. In an embodiment, the conductivity of the elastomer member 136 can be determined using the following equation:

$$\text{Conductivity} \approx \left(\frac{\Omega}{\text{square}}\right)(\pi)(2Rh - h^2)$$

where $\Omega$/square denotes the resistivity of a surface material, and h and R (FIG. 2A) respectively represent the axial displacement of the trigger 120 and the radial expansion of the elastomer member 136 against the circuit board 140. In an embodiment, the radial expansion R is greater than or equal to axial displacement h. $\pi \times (2Rh-h^2)$ in this equation represents the cross-sectional area of the contact surface of the elastomer member 136 with the circuit board 140.

Figure 4A:
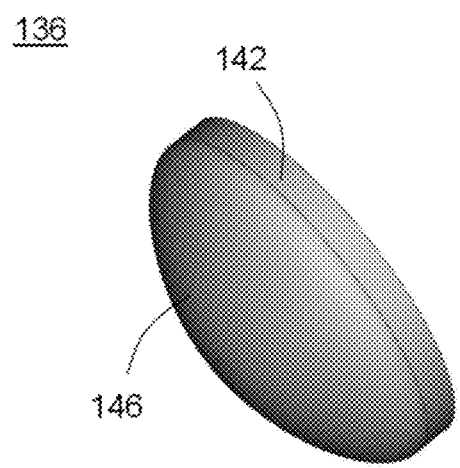
FIGS. 4A-4C are perspective views of an example of the elastomer member of FIGS. 2A-2C, according to an embodiment.
Figure 4B:
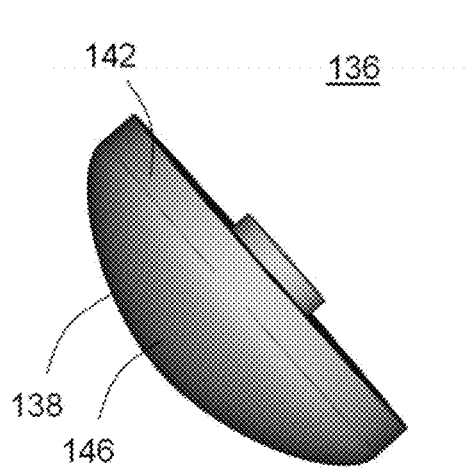
Figure 4C:
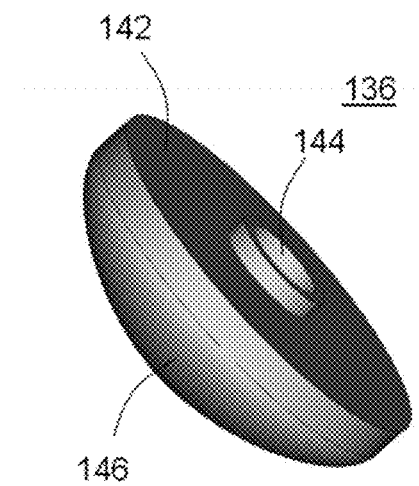

FIGS. 4A through 4C depict various views of the elastomer member 136, according to an embodiment. In an embodiment, elastomer member 136 includes a disc-shaped base member 142 having a central opening 144 for receiving the end of the plunger 132. The central opening 144 may include a rim around it and may be threaded to securely receive a threaded end of the plunger 132. Mounted on the base member 142 opposite the central opening 144 is an elastomer membrane 146, which as described above, is a substrate of any material exhibiting elastic or rubber-like properties including a distributed filling of conductive material. In this embodiment, as described above, the surface 138 of the elastomer membrane 146 has an arcuate shape.

Figure 5:
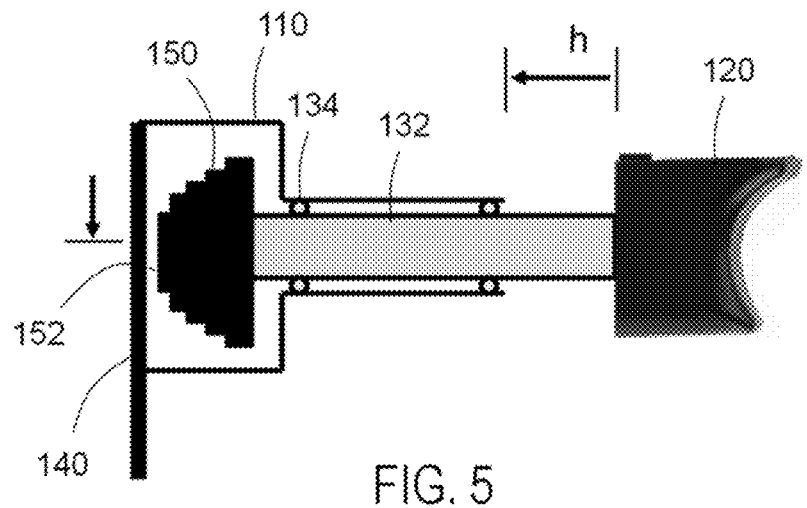
FIG. 5 is a partial side view of an example of an elastomer member having a non-planar surface with a stepped profile according to an embodiment.
Figure 6:
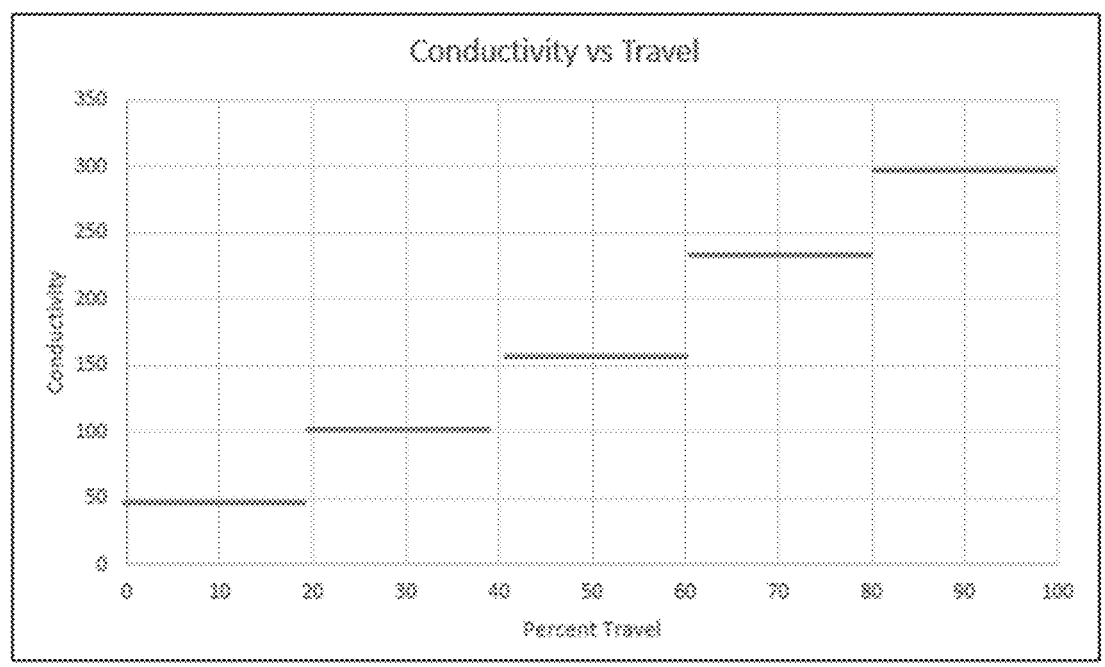
FIG. 6 is a plot of an example of a conductivity chart associated with the elastomer member of FIG. 5, according to an embodiment.

FIG. 5 depicts a partial side view of the input unit 110 including an elastomer member 150 in which the non-planar surface 152 includes a stepped profile, according to an embodiment. In this embodiment, the non-planar surface 152 has a generally conical shape including a series of steps along its slanted surface. As the trigger 120 is pressed, a greater number of the steps come into contact with the conductive tracks of circuit board 140. This results in a stepped conductivity versus travel profile, as shown in the graph of FIG. 6, including a series of flat discrete steps at approximately 20% increments.

Figure 7A:
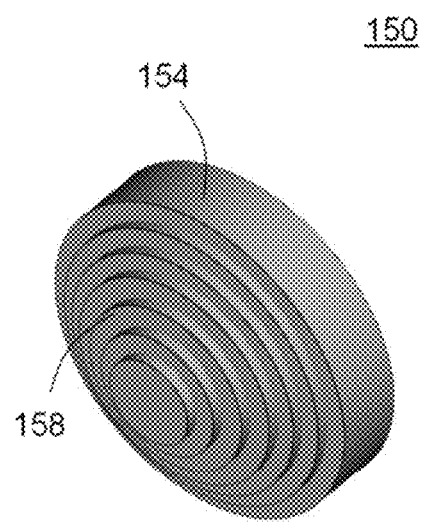
FIGS. 7A-7C are perspective views of an example of the elastomer member of FIG. 5, according to an embodiment.
Figure 7B:
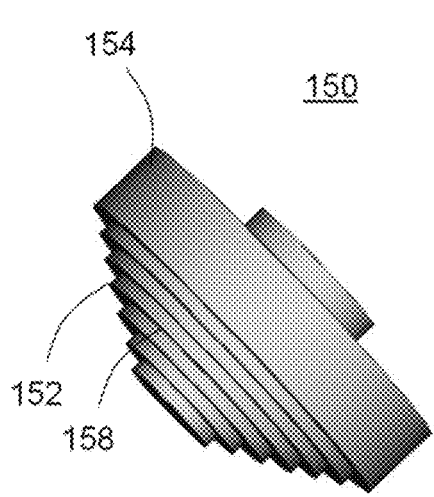
Figure 7C:
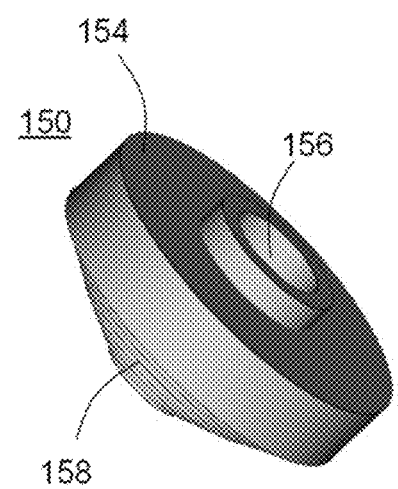

FIGS. 7A through 7C depict various views of the elastomer member 150 including the stepped profile, according to an embodiment. In an embodiment, elastomer member 150 includes a disc-shaped base member 154 having a central opening 156 for receiving the end of the plunger 132. The central opening 156 may include a rim around it and may be threaded to securely receive a threaded end of the plunger 132. Mounted on the base member 154 opposite the central opening 156 is an elastomer member 158, which as described above, is a substrate of any material exhibiting elastic or rubber-like properties including a distributed filling of conductive material. In an embodiment, the base member 154 may be at least partially integrally formed of elastomer material. In this embodiment, as described above, the surface 152 of the elastomer member 150 has a stepped profile including a series of disc-shaped members that exhibit an incremental reduction in diameter as they move away from the base member 154.

Figure 8A:
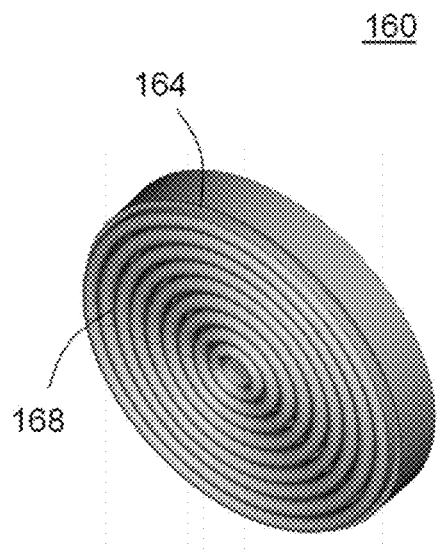
FIGS. 8A-8C are perspective views of an example of an elastomer member having a disc-shaped surface including a series of concentrically aligned ring-shaped members according to an embodiment.
Figure 8B:
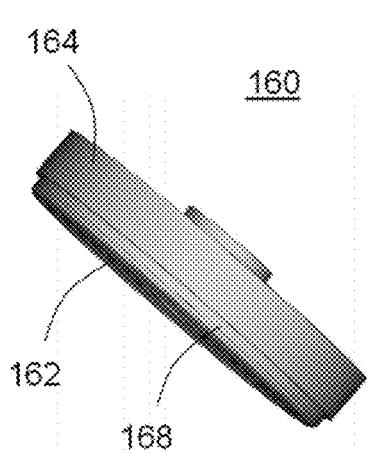
Figure 8C:
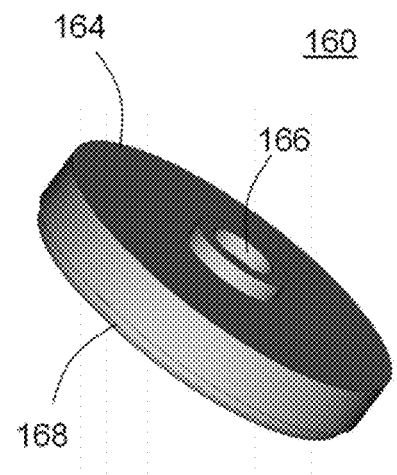
Figure 9A:
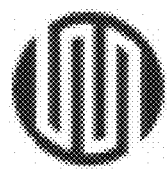
FIGS. 9A-9F are plan views of an example of various patterns of circuit board conductive tracks according to embodiments.
Figure 9B:
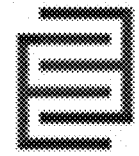
Figure 9C:
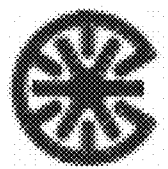
Figure 9D:
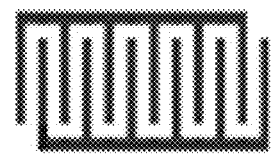
Figure 9E:
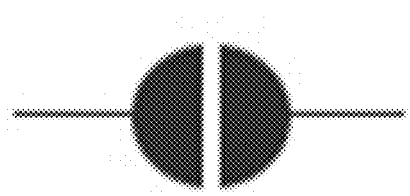
Figure 9F:

FIGS. 8A through 8C depict various views of an elastomer member 160, according to yet another embodiment. In this embodiment, elastomer member 160 includes a disc-shaped base member 164 having a central opening 166 for receiving the end of the plunger 132. The central opening 166 may include a rim around it and may be threaded to securely receive a threaded end of the plunger 132. Mounted on the base member 164 opposite the central opening 166 is an elastomer membrane 168, which as described above, is a substrate of any material exhibiting elastic or rubber-like properties including a distributed filling of conductive material. In this embodiment, the non-planar surface 162 of the elastomer member 160 includes a series of ring-shaped bumps centered on the center of the base member 164, forming annular grooves in between. As the elastomer member 160 is compressed against the circuit board 140, it expands to fill the void in the annular grooves, thus increasing the contact surface area and conductivity of the elastomer member 160.

FIGS. 9A-9F depict various patterns of circuit board conductive tracks, according to embodiments of this disclosure. In an embodiment, the conductive tracks include two nodes that are electrically disconnected on the circuit board. One of the two nodes (i.e., supply node) is connected to a voltage supply and the other node (i.e., sense node) is connected to a controller that senses its voltage. The two nodes can only be electrically connected upon contact with the elastomer member, allowing the variable conductivity of the elastomer member to vary the voltage on the sense node. The various patterns are designed to maximize the contact surface area between the conductive tracks and the elastomer member and are suitable for different profiles of the elastomer membrane.

Thus, in the case of an elastomer member such as, for example, the elastomer member 150 (FIGS. 7A-7C), having a non-planar surface with a stepped profile associated with a stepped conductivity curve in relation to trigger displacement, the supply node may be coupled to a power source having a first voltage. In an embodiment, the controller is configured to vary the speed of the motor as a function of a second voltage sensed on the sense node, wherein the difference between the first voltage and the second voltage is associated with a varying electrical resistance of the elastomer member associated with a surface area between the non-planar surface and the plurality of conductive tracks. In an embodiment, the controller may be configured to vary the speed of the motor by varying a duty cycle of a pulse-width modulated (PWM) signal for driving the motor.

An alternative embodiment of the invention is described with reference to FIGS. 10 and 11.

In this embodiment, the elastomer member is provided with a high density of conductive fill, therefore providing a high level of electrical conductivity. The elastomer member is provided with a contour as described above, such that a tip of the elastomer member makes initial contact with the circuit board as the trigger is pressed, and the contact area gradually increases as the trigger is further pressed.

Figure 10:
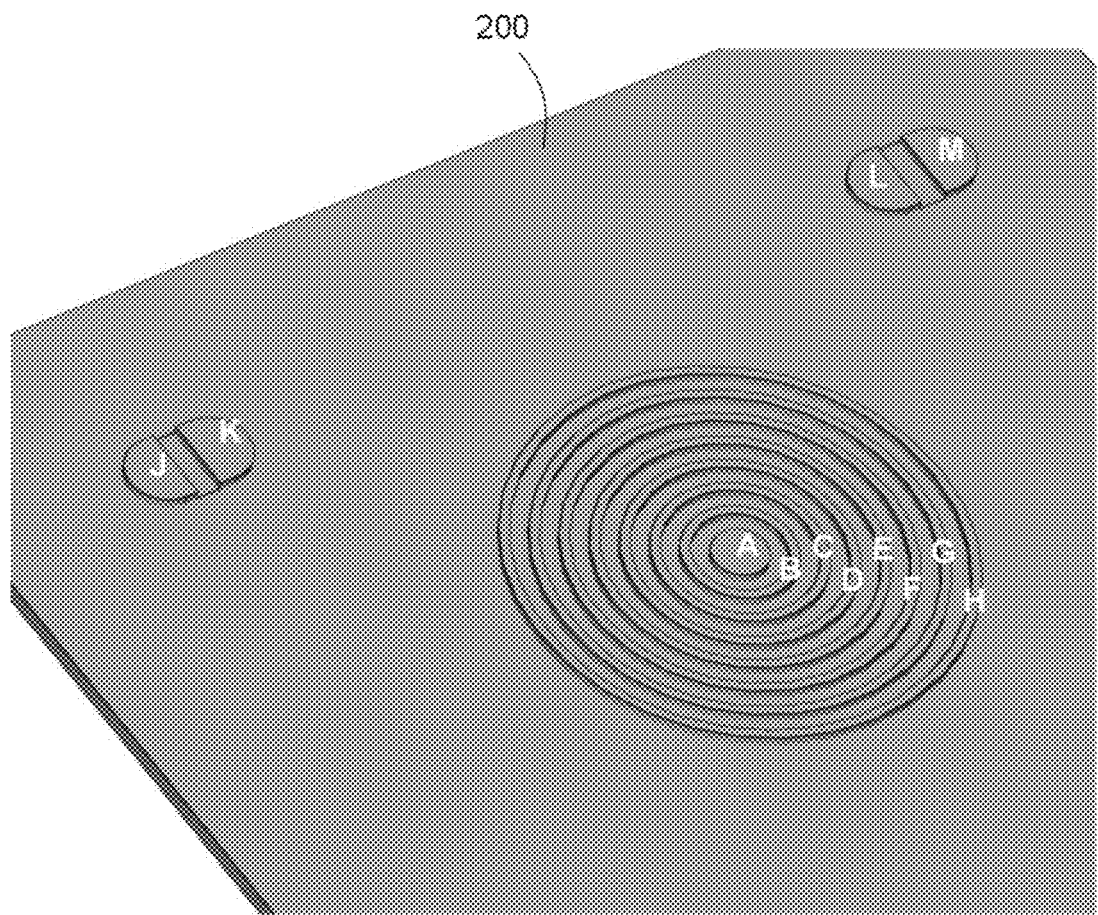
FIG. 10 is a partial perspective view of an example of a circuit board including directional conductive tracks and variable-speed conductive tracks having a circumferential ring shape, according to an embodiment.

In an embodiment, as shown in FIG. 10, circuit board 200 is constructed with a series of conductive tracks disposed on a top surface of the circuit board 200 facing the elastomer member. The conductive tracks are coupled via a series of plated-through vias to a bottom surface of the circuit board 200. In this embodiment, conductive tracks A through H are a series of circular and/or ring-shaped pads centered at the same point at different radii. Conductive tracks A through H are oriented such that the elastomer member initially makes contact with conductive tracks A and B, owing to the curvature of the elastomer member facing the circuit board 200, and as the trigger is pressed further, the elastomer member comes into contact with conductive track, C, D, etc. Conductive track H is only contacted upon full trigger press. By connecting conductive tracks A through H via a series of resistors disposed on the bottom surface of the circuit board 200, a variable voltage correlated with the number of conductive tracks contacted by the elastomer member is obtained. In an embodiment, conductive tracks J through M are further provided on the circuit board 200 and are contacted by additional elastomer members and/or connectors. Conductive tracks J through M are used to input other parameters such as the desired direction of rotation of the motor, speed setting, lighting density, tool mode selection, etc.

Figure 11:
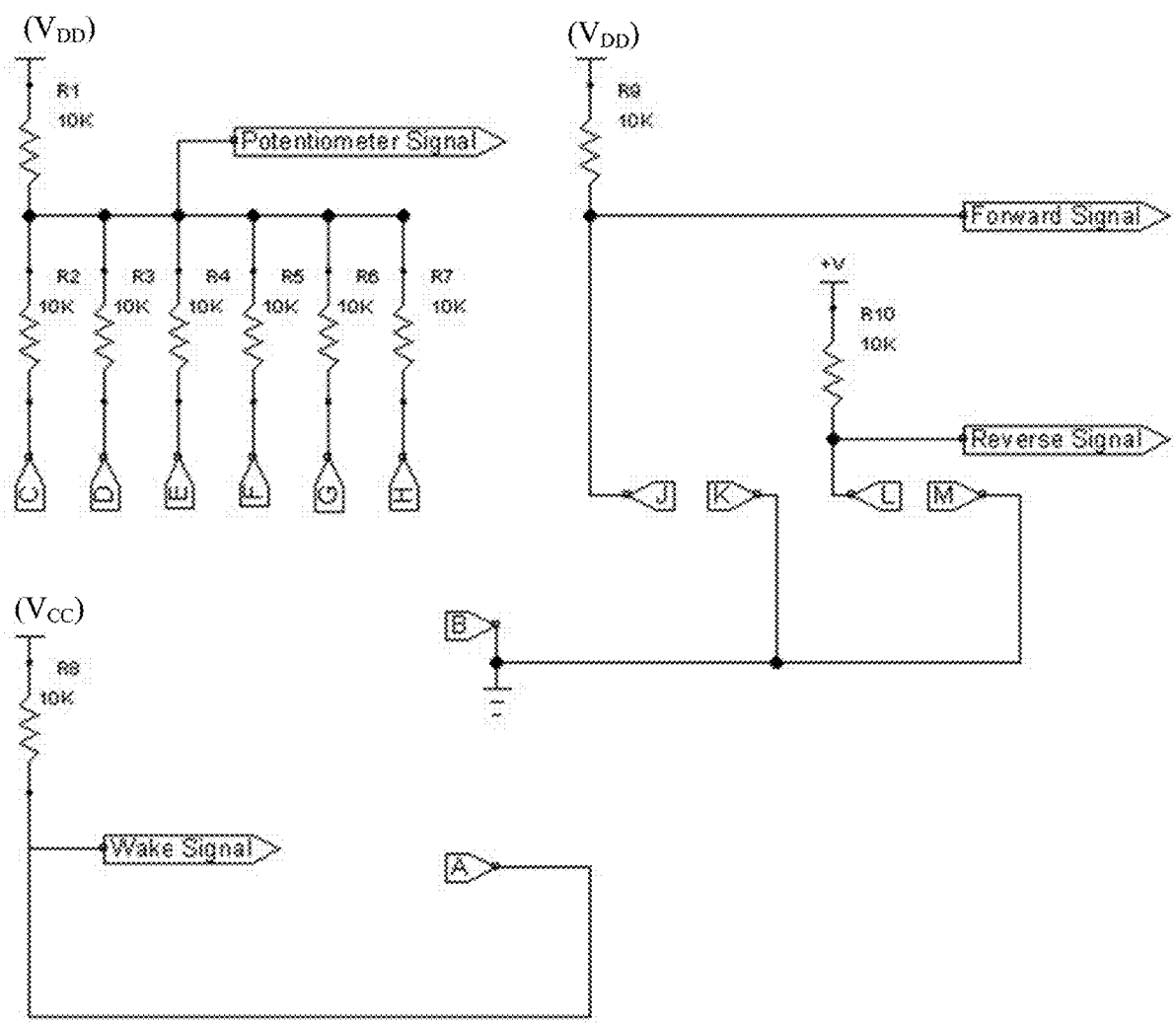
FIG. 11 is an exemplary schematic diagram of the circuit board including a resistor divider circuit, according to an embodiment.

FIG. 11 depicts a circuit diagram 201 of a variable-speed and direction detection mechanism using the conductive tracks A through M, according to an embodiment. In an embodiment, conductive track A is coupled to a first voltage supply such as, for example, the V+ terminal (e.g., $V_{CC}$) of the battery pack 108 (FIG. 1) through a resistor R8. The $V_{CC}$ signal may be, for example, maximally 20 volts or nominally 18V when coupled to a 20V max power tool lithium-based battery pack. Upon initial actuation of the trigger, the elastomer member connects conductive tracks A and B. This produces a wake signal that is used to energize the control electronics within the electronic control module 130. At this point, the voltage output of a Potentiometer Signal is equivalent to a step-down voltage (e.g., $V_{DD}$ or 3.3V) from the V+ terminal of the battery pack.

In one example, conductive tracks C through H are coupled to a second voltage supply such as, for example, the step-down voltage (e.g., $V_{DD}$, which may be for example approximately 3.3V) from the V+ terminal of the battery pack 108 (FIG. 1) through a resistor divider (not shown). As the trigger is further pressed, conductive tracks A, B and C of the circuit board are connected, activating the resistor R2 in the voltage divided that further includes R1. This reduces the voltage of the Potentiometer Signal. Similarly, as the trigger is pressed even further, conductive tracks A, B, C and D of the circuit board are connected, further activating the resistor R3 and placing it in parallel with R2 in the bottom leg of the voltage divider. This activation lowers the resistance of the bottom leg of the voltage divider further and reduces the voltage of the Potentiometer Signal. As the trigger is pressed even further, more of the conductive tracks are connected, increasing the number resistors connected in parallel in the lower leg of the voltage divider, which reduces the voltage of the Potentiometer Signal even further. In this manner, the variable-voltage sensed at the Potentiometer Signal node corresponds to the displacement of the trigger switch. This result may be similar to a potentiometer, with discrete quantized steps for control of the tool. It is noted that this configuration need not be limited to six nodes but may contain any number of conductive tracks and resistors to increase the number of steps, with greater control resolution resulting from an increasing number of steps.

As stated above, conductive tracks J through M are used to input other parameters such as the desired rotational direction of the motor, speed setting, lighting density, tool mode selection, etc. In this circuit diagram 201, a directional actuator/connector such as, for example, the forward/reverse button 122 (FIG. 1), may be provided that is positioned adjacent to and electrically connects conductive tracks J and K (e.g., set of forward tracks) to activate a Forward Signal or connects conductive tracks L and M (e.g., set of reverse tracks) to activate a Reverse Signal. The controller controls the direction of rotation of the motor according to these signals.

Figure 12:
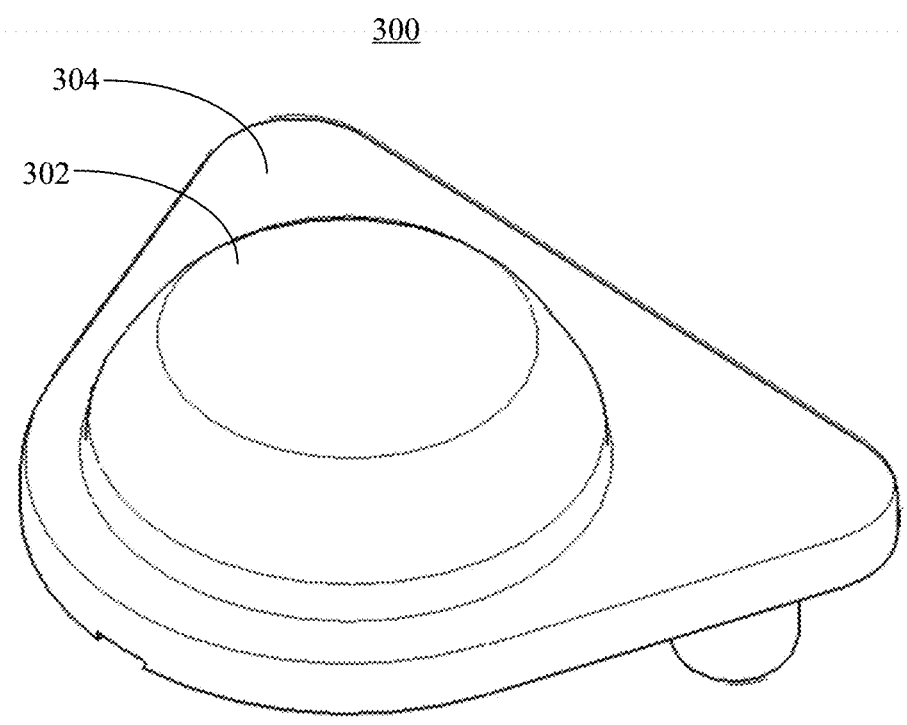
FIG. 12 is a perspective view of an example of an elastomer member according to an embodiment.

FIG. 12 depicts a top perspective view of an elastomer member 300, according to an alternative embodiment. Elastomer member 300 including a main body 304 and a flexible button 302 that is made of elastically-deformable material such as insulating rubber and is flexibly moveable along a movement axis. As discussed later, the main body 304 secures the elastomer member 300 relative to a switch assembly.

Figure 13:
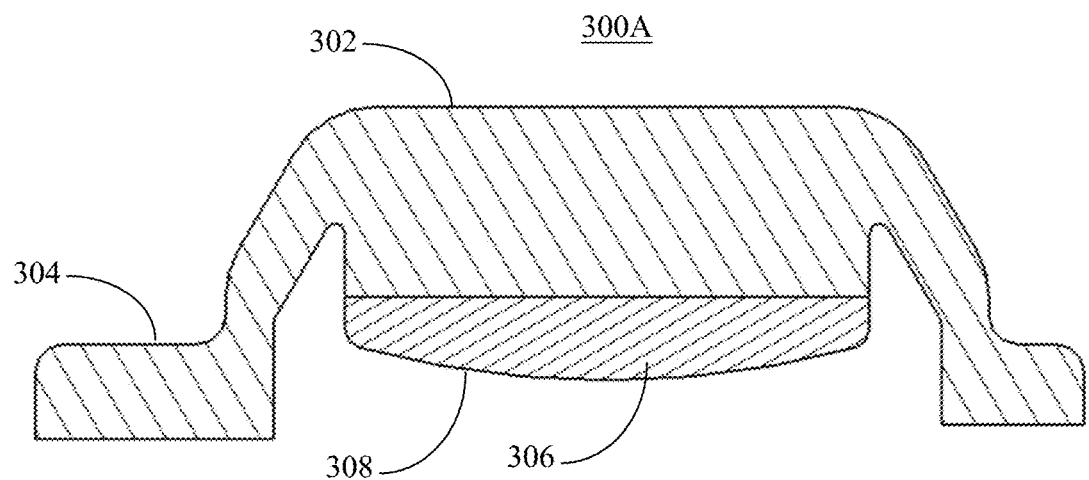
FIG. 13 is a sectional side view of an example of the elastomer member having a single conductive region, according to a first embodiment.

FIG. 13 depicts a cross-sectional view of elastomer member 300A, according to a first embodiment. In this embodiment, the elastomer member 300A includes a single-piece conductive elastomer membrane 306 including an electrically-conductive non-planar surface 308. The material construction of elastomer membrane 306 is as previously discussed, and may include conductive rubber, conductive graphite, conductive metallic particles mixed into plastic molding, etc. The elastomer membrane 306 is configured to have a relatively high level of electrical conductivity. In an embodiment, the elastomer membrane 306 of the elastomer member 300 is positioned facing conductive tracks A-H of circuit board 200 (FIG. 10) oriented substantially perpendicularly to the movement axis of the flexible button 302. Thus, engagement of the flexible button 302 in the direction of the circuit board 200 causes the elastomer membrane 306 to progressively contact a greater number of the conductive tracks A-H. The amount of surface area contact between the elastomer membrane 306 of the elastomer member 300 and the conductive tracks A-H of the circuit board 200 is directly correlated to the axial travel of the flexible button 302. This arrangement provides for a compact and efficient variable-speed detection mechanism, as discussed above.

Figure 14:
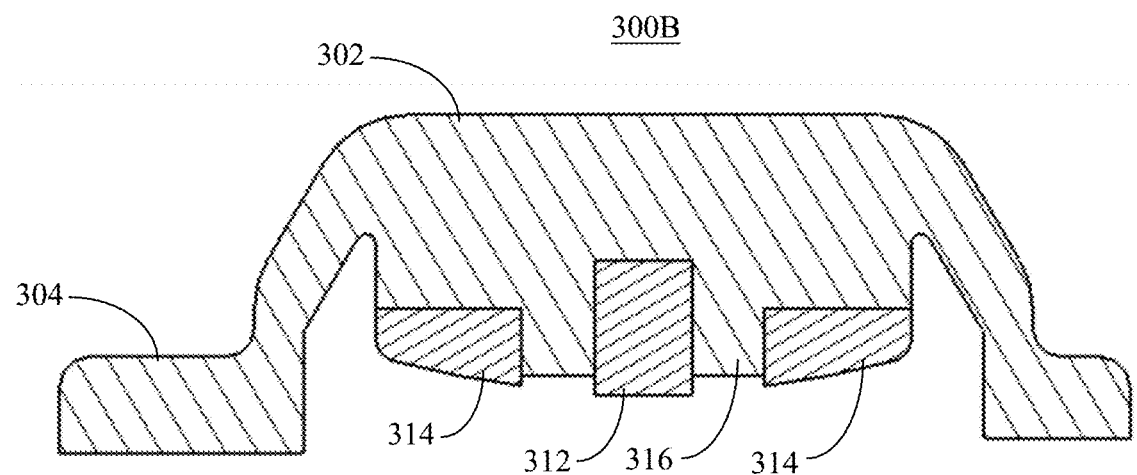
FIG. 14 is a sectional side view of an example of the elastomer member having isolated conductive regions, according to a second embodiment.
Figure 15:
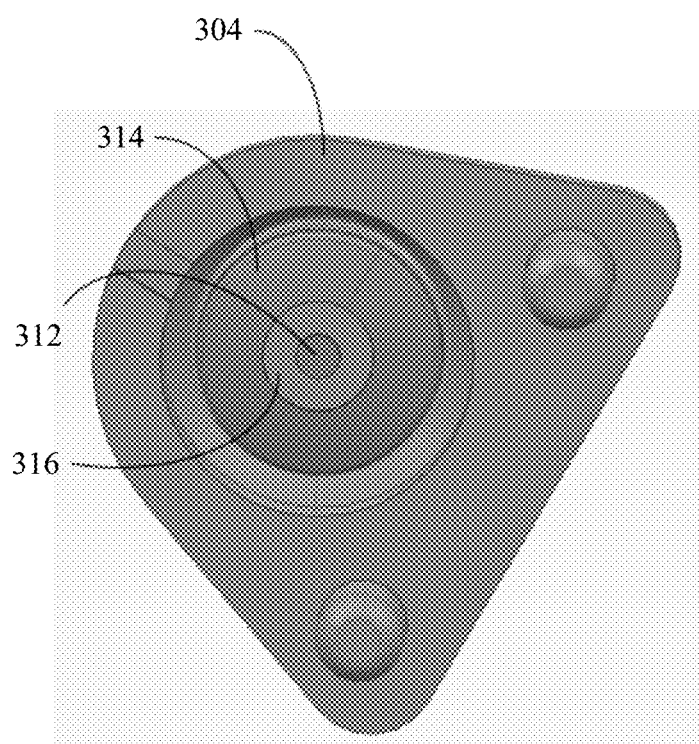
FIG. 15 is a perspective bottom view of the elastomer member of the second embodiment.

FIG. 14 depicts a cross-sectional view of elastomer member 300B, according to a second embodiment. FIG. 15 depicts a perspective bottom view of the elastomer member 300B, according to an embodiment. In this embodiment, the elastomer membrane is provided as two distinct conductive bodies including a conductive central region 312 and a conductive peripheral region 314, separated via an intermediary insulative region 316. In an embodiment, insulative region 316 is formed as a part of the plastic mold forming the remainder parts of the elastomer member 300B (including the flexible button 302 and the main body 304). In an embodiment, each of the conductive central region 312 and the conductive peripheral region 314 are made of conductive elastomer material.

Providing the elastomer membrane as two discrete regions in this isolated configuration may provide various safety and reliability advantages. For example, the conductive central region 312 may be used to generate a first activation signal based on the initial actuation of the flexible button 302, and the conductive peripheral region 314 may be used to generate a secondary and independent activation signal based on further actuation of the flexible button 302. The controller may be configured to activate the motor only if both signals have been activated, thus providing a redundant mechanism for increased safety. This elastomer membrane structure may also be utilized in conjunction with a double pole, single throw (DPST) switch in some applications for added safety and redundancy.

Figure 16:
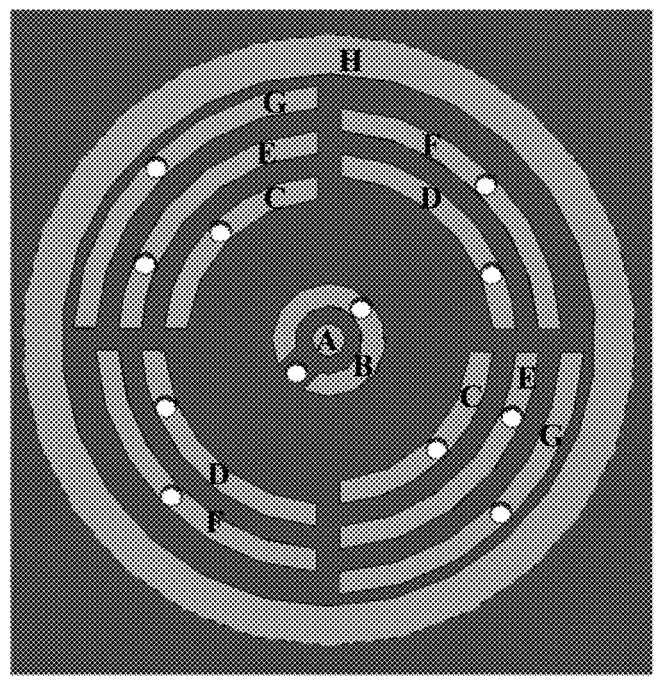
FIG. 16 is a partial view of a circuit board showing variable-speed conductive tracks configured for use with the elastomer member of the second embodiment, according to an embodiment.

FIG. 16 depicts a partial view of a circuit board 320 showing conductive tracks A-H configured for use with elastomer member 300B described above. In an embodiment, conductive tracks A-H includes a central node (e.g., track A) and a plurality of arcuate nodes (e.g., tracks B-H) disposed around the central node. Tracks A and B are distanced from the tracks C-H. In an embodiment, tracks B and C is coupled to a ground node (e.g., the B-node of the battery pack) when configured to use with a circuit as shown in the circuit diagram 201 of FIG. 11. It should be understood, however, that one or both of the tracks B and C may be alternatively coupled to a supply node (e.g., to B+ node of a 20V max power tool lithium-based battery pack, thus having a maximal voltage of 20 volts or a nominal voltage of 18V, or a Vdd signal having a smaller voltage than the battery pack), depending on the circuit configuration.

The conductive central region 312 may be positioned facing tracks A and B. In such a configuration, the controller is configured to sense a prescribed voltage change on track A when the conductive central region 312 of the elastomer member 300B makes electrical contact between node A and track B (and thus grounding node A in one example), and to activate a motor drive mechanism accordingly.

Additionally, the conductive peripheral region 314 may be positioned facing tracks C through H. In an example, the conductive tracks C-H are electrically coupled to a resistor divider such as the resistor divider shown in the circuit diagram 201 (FIG. 11), already discussed. Progressive engagement of the flexible button 302 of the elastomer member 300B causes the conductive peripheral region 312 to gradually contact tracks C through H as the non-planar surface of the elastomer member 300B is pressed into the circuit board 300, thus coupling track C (e.g., ground node) to more of the conductive tracks D through H in a stepwise fashion. The number of conductive tracks D through H contacted by the conductive peripheral region 314 couple a corresponding number of resisters (e.g., resistors R2-R7 in the resistor divider circuit of FIG. 11) to the ground node and causes a corresponding voltage drop across the resistor R1. A variable voltage signal (e.g., Potentiometer Signal in FIG. 11) coupled to the resistor R1 thus outputs a voltage level corresponding to the number of conductive tracks D-H contacted by the conductive peripheral region 314, which in turn corresponds to an axial travel distance of the flexible button 302 of the elastomer member 300B.

In the illustrated example, the conductive tracks include a circumferential continuous ring shaped track H and non-continuous ring-shaped tracks C-G. For example, track C includes two arcs instead of a complete ring, track D includes two arcs instead of a complete ring, and so forth. The non-continuous circumferential ring shape may also be radially staggered. In the illustrated example, the outer diameter of track C overlaps (e.g., has the same or similar radial distance) with the inner diameter of track D, the outer diameter of track D overlaps (e.g., has the same or similar radial distance) with the inner diameter of track E, and so forth. Such a configuration enables greater spacing and finer step granularity.

Figure 17:
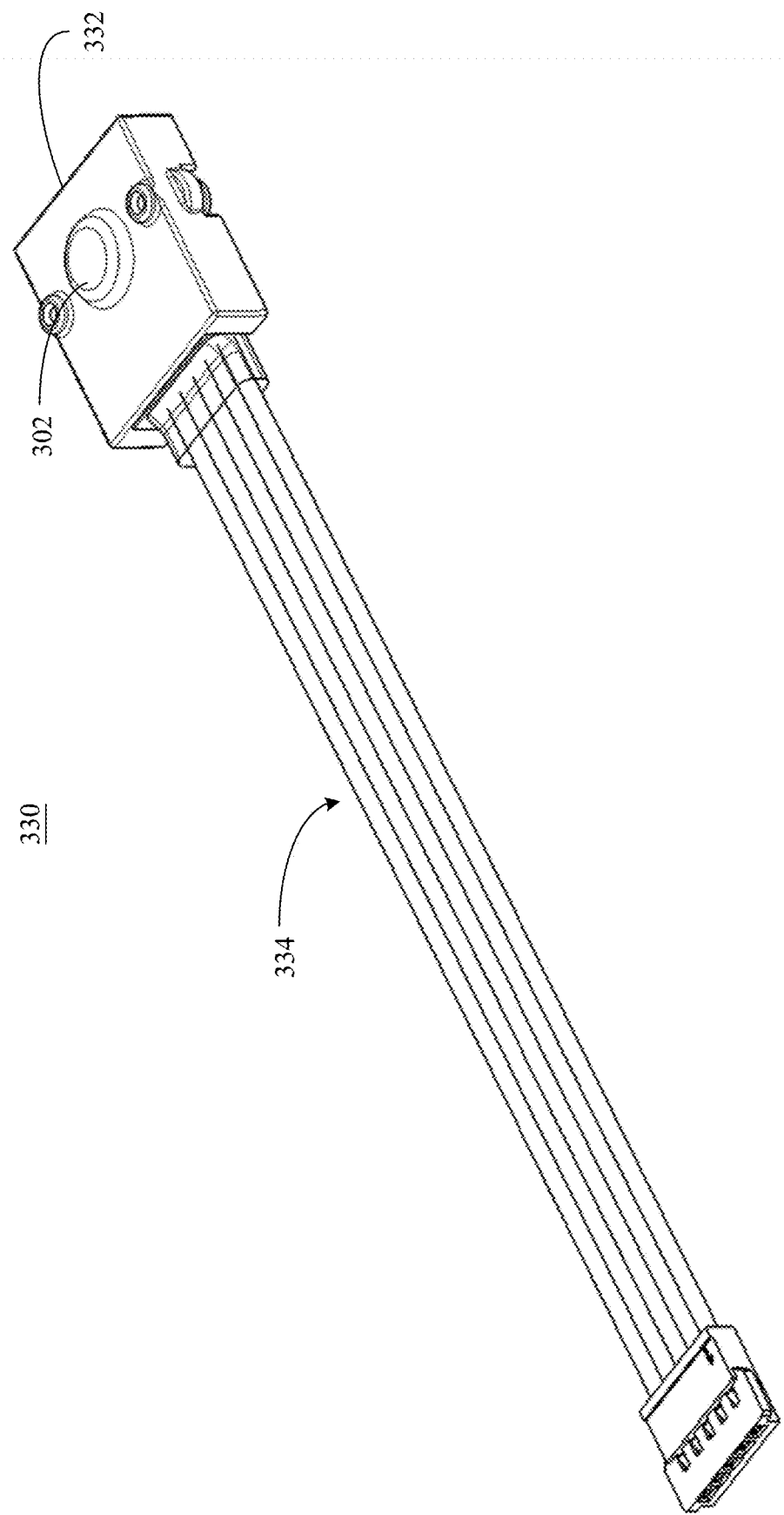
FIG. 17 is perspective view of a variable-speed switch assembly incorporating the elastomer member and the circuit board, according to an embodiment.
Figure 18:
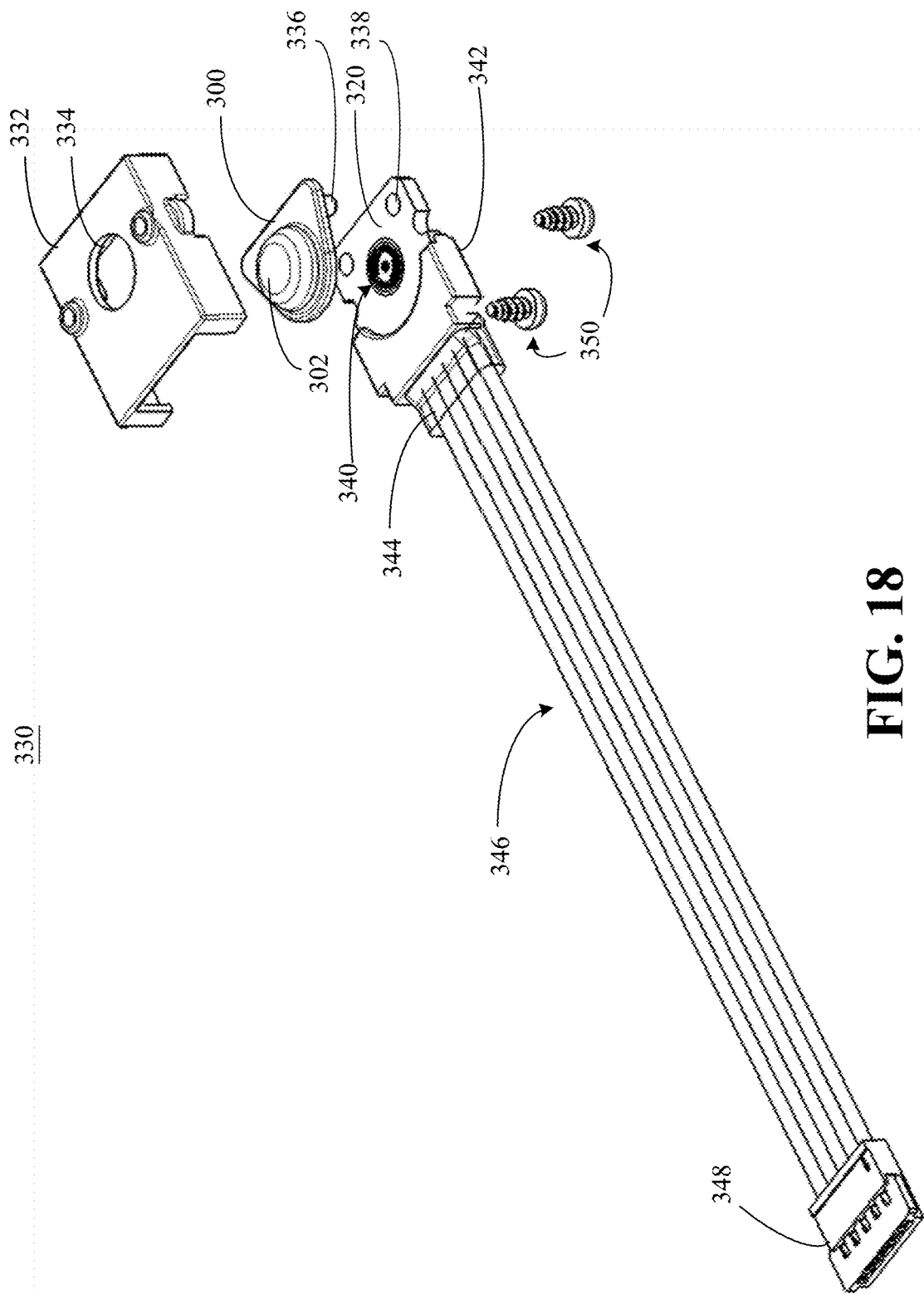
FIG. 18 is an exploded view of the switch assembly, according to an embodiment.
Figure 19:
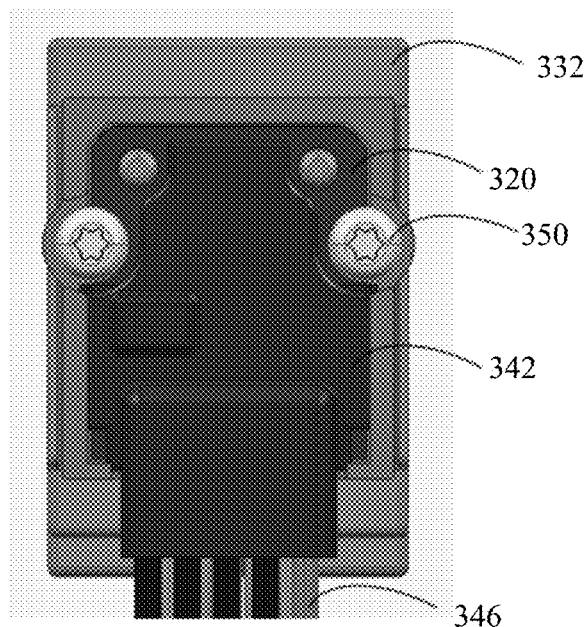
FIG. 19 depicts a rear view of the switch assembly, according to an embodiment.

FIG. 17 depicts a perspective view of a variable-speed switch assembly 330 incorporating the elastomer member 300 and the circuit board 320, according to an embodiment. FIG. 18 depicts an exploded view of the switch assembly 330, according to an embodiment. FIG. 19 depicts a rear view of the switch assembly 330, according to an embodiment.

With reference to FIGS. 17-19, switch assembly 330 includes a cover 332 (e.g., molded plastic) mounted on the elastomer member 300 and having an opening 334 through which the flexible button 302 of the elastomer member 300 extends out. The elastomer member 300 is mounted on the circuit board 320 and secured via two pins 336 extending downwardly from the main body received into corresponding openings 338 of the circuit board 320, with the circuit board 320 being oriented substantially perpendicularly to the axis of movement of the flexible button 302. Conductive tracks 340 (e.g., conductive tracks A-H discussed above) are mounted on the circuit board 320 facing the elastomer member 300. An overmold structure 342 is formed partially around both surfaces of the circuit board 320 and supports a first connector 344 in contact with the circuit board 320. A wiring harness 346 is coupled to the first connector 344 on one end and a second connector 348 for communication with the controller (not shown) and/or the battery pack. The wiring harness 346 carries Vdd (B+), Vcc, and Gnd signals to the circuit board 320 and provides the output Potentiometer Signal from the circuit board 320 to the controller. A set of screws 350 are received through a bottom area to fasten the circuit board 320 to the cover 332.

Figure 20:
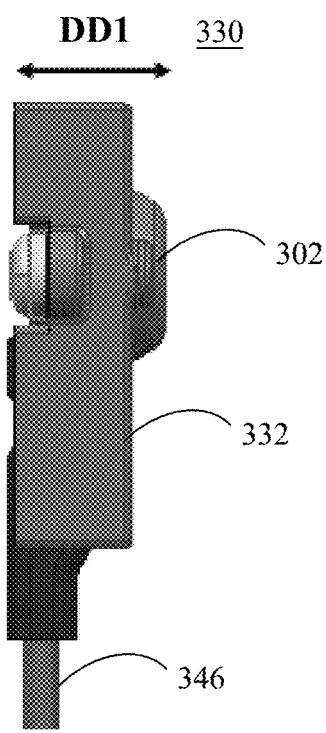
FIG. 20 depicts a side view of the switch assembly, according to an embodiment.
Figure 21:
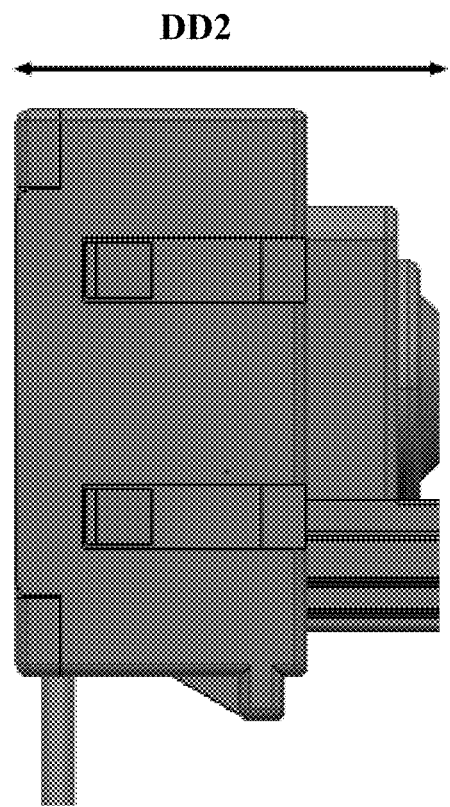
FIG. 21 depicts a side view of a conventional prior art switch assembly having a linear potentiometer or conductive track arrangement for variable-speed detection by way of comparison.

FIG. 20 depicts a side view of the switch assembly 330, according to an embodiment. By comparison, FIG. 21 depicts a side view of a conventional prior art switch assembly having a linear potentiometer or conductive track arrangement for variable-speed detection. In an embodiment, switch assembly 330 as described above has a length DD1 having a maximum value of 10 mm, preferably a maximum value of 8.8 mm, more preferably a maximum value of 7.7 mm, yet more preferably a maximum value of 6.6 mm. The maximum axial travel distance of the flexible button 302 of the elastomer member 300 is less than or equal to approximately 4.5 mm, preferably less than or equal to approximately 3.7 mm, more preferably less than or equal to approximately 3.2 mm, more preferably less than or equal to approximately 2.7 mm, even more preferably less than or equal to approximately 2.2 mm. With this arrangement, the switch assembly 330 is capable of providing a variable-speed detection resolution of at least 4 speed steps, preferably at least five speed steps. The switch assembly 330 is therefore suitable for use for a wide range of variable-speed power tool applications having speed ranges of zero to at least 5,000 RPM. By comparison, the prior art switch assembly of FIG. 21 used in similar applications has a length of approximately 21 mm.

Figure 22:
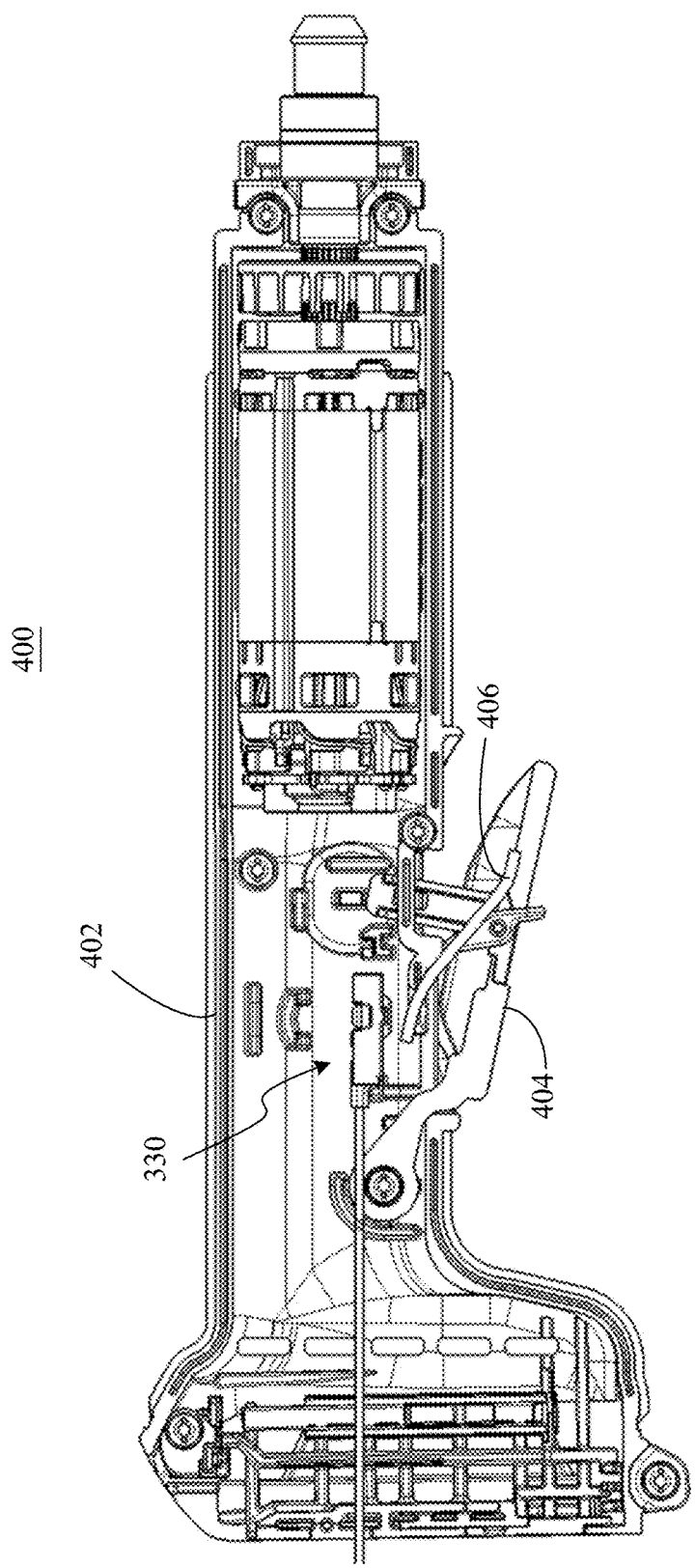
FIGS. 22 and 23 respective depict a full side view and a zoomed-in side view of a power tool including the switch assembly installed in a housing thereof, according to an embodiment.
Figure 23:
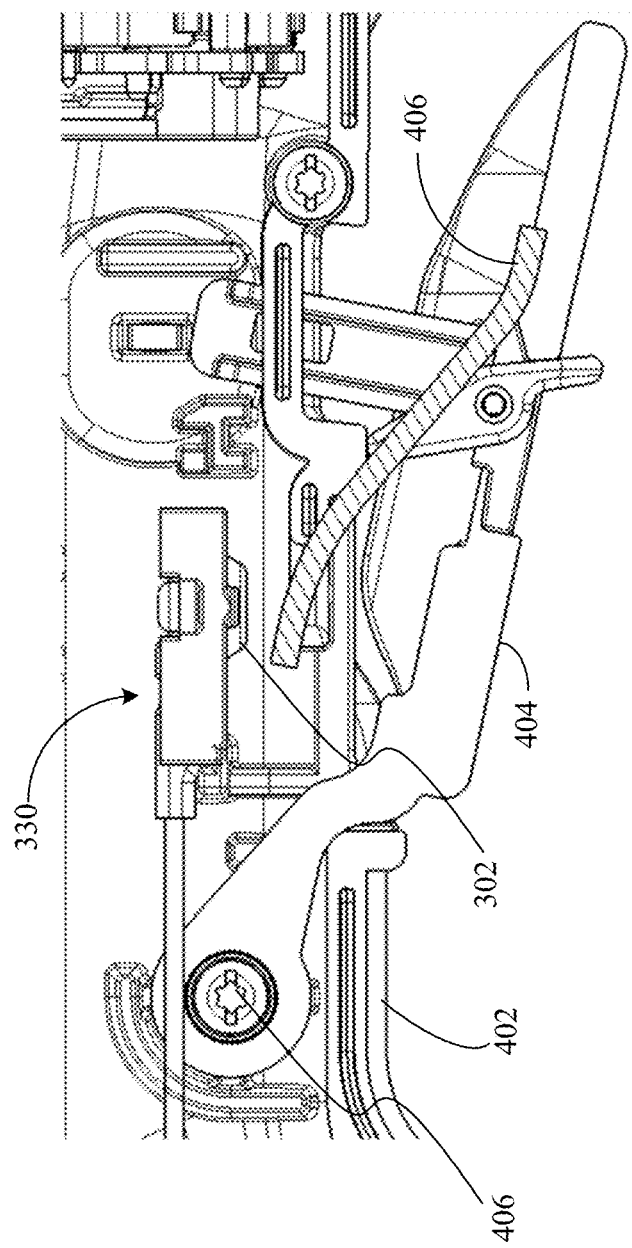

FIGS. 22 and 23 respective depict a full side view and a zoomed-in side view of a power tool 400 including the switch assembly 330 installed in a housing 402 thereof, according to an embodiment. The power tool 400 in this example is a cordless impact wrench having an elongate body, though it should be understood that power tool 400 may be of any type or configuration and may include many of the same components and features previously described with reference to FIG. 1. In the illustrated example, a trigger switch 404—in this example a paddle switch—is mounted on the housing 401 and pivotable relative to the housing 401 via a pivoting structure 406. The switch assembly 330 is mounted inside the housing 402 and structurally held via one or more ribs (not shown) provided interior to the housing 402. The flexible button 302 of the switch assembly 330 is mechanically coupled to the trigger switch 404 via a leaf spring actuator 406. Thus, the leaf spring actuator 340 transfers the travel distance of the trigger switch 404 to apply a springing force to the flexible button 302. AS the travel distance of the trigger switch 404 increases, for force applied to the flexible button 302 correspondingly increases, allowing the switch assembly 330 to output a variable voltage that is associated with the travel distance of the trigger switch 404.

In other exemplary power tools such as power tool 100 of FIG. 1, switch assembly 330 may be similarly mounted inside the handle of the tool, and the flexible button 302 may be mechanically coupled to the trigger switch 120 via an intermediary plunger.

In an alternative embodiment, although now shown, the switch assembly 330 may be mountable on the housing 402 of power tool 400, or even be integrally formed as a part of the housing 402, and the flexible button 302 may be positioned outside the body of the housing 402 for direct engagement and actuation by a user, e.g., in place of the trigger switch 404.

The above-described embodiments of the invention provide several advantages over the conventional potentiometer designs. The conductive elastomer provides significant design advantages over conventional wiper designs that require proper alignment and retention with the plunger. This also presents significant size advantages, making this design suitable for denser and smaller power tools. Furthermore, the elastomer member can be used to serve as its own gasket material, providing a seal against the housing of the control module 130 against ingress of water, dust, and metal contaminate.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "bottom," "lower," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

We claim:

1. An apparatus comprising:
 a motor;
 a trigger assembly including a trigger member and an elastomer member mechanically coupled to the trigger member and moveable along a movement axis, wherein the elastomer member includes an electrically-conductive non-planar surface;
 a controller configured to operate the motor; and
 a circuit board oriented substantially perpendicularly to the movement axis, the circuit board including a plurality of conductive tracks facing the non-planar surface of the elastomer member and coupled to a resistor divider having a divider output, wherein the plurality of conductive tracks include a plurality of ring-shaped or arcuate tracks arranged substantially coaxially with the movement axis of the elastomer member such that, as the elastomer member moved in the direction of the circuit board, a variable number of the plurality of conductive tracks is progressively engaged by the non-planar surface of the elastomer member, providing a current path from the elastomer member to the divider output of the resistor divider through a corresponding variable number of resistors in the resistor divider,
 wherein controller is configured to vary a speed of the motor based on the output of the resistor divider.

2. The apparatus of claim 1, wherein the non-planar surface includes a conductive central region, a conductive peripheral region, and an insulative region positioned between the conductive central region and the conductive peripheral region.

3. The apparatus of claim 2, wherein the plurality of conductive tracks is arranged to engage the conductive peripheral region, and wherein the circuit board further includes at least one central conductive track arranged to engage the conductive central region.

4. The apparatus of claim 3, wherein an increased surface area of the conductive peripheral region engaging with the plurality of conductive tracks causes a greater number of resistors to be activated in the resistor divider.

5. The apparatus of claim 1, wherein the plurality of conductive tracks includes a circumferential ring shape.

6. The apparatus of claim 5, wherein the circumferential ring shape is non-continuous.

7. The apparatus of claim 1, wherein the trigger assembly includes a directional actuator, further comprising a plurality of directional tracks positioned adjacent to the directional actuator, and wherein the controller is to control a rotational direction of the motor based on contact between the directional actuator and the plurality of directional tracks.

8. The apparatus of claim 1, wherein the elastomer member is mechanically coupled to the trigger member via a leaf spring actuator to mechanically apply a pressure by the non-planar surface against the plurality of conductive tracks that is responsive to a force applied by a user to the trigger member.

9. The apparatus of claim 1, wherein the elastomer member is configured to have a maximum travel distance of less than or equal to approximately 4.5 mm and the plurality of conductive tracks is configured to sense at least four speed steps.

10. The apparatus of claim 1, further comprising a central node, wherein the plurality of conductive tracks is disposed around the central node.

11. The apparatus of claim 10, wherein a first of the plurality of conductive tracks disposed immediately around the central node is one of a supply node or a ground node, and wherein the controller is configured to activate a motor drive mechanism when the non-planar surface of the elastomer member makes electrical contact between the central node and the first of the plurality of ring-shaped members.

12. A trigger assembly comprising:
an elastomer member including a main body, a flexible button formed in the main body and moveable along an axis of movement, and a non-planar surface formed opposite the flexible button; and
a circuit board oriented substantially perpendicularly to the axis of movement and includes a plurality of conductive tracks facing the non-planar surface of the elastomer member and coupled to a resistor divider having a divider output, wherein the plurality of conductive tracks include a plurality of ring-shaped or arcuate tracks arranged substantially coaxially with the movement axis of the elastomer member such that, as the elastomer member moved in the direction of the circuit board, a variable number of the plurality of conductive tracks is progressively engaged by the non-planar surface of the elastomer member, providing a current path from the elastomer member to the divider output of the resistor divider through a corresponding variable number of resistors in the resistor divider to output a variable-voltage signal accordingly.

13. The trigger assembly of claim 12, wherein the elastomer member is configured to have a maximum travel distance of less than or equal to approximately 4.5 mm and the plurality of conductive tracks is configured to sense at least four speed steps.

14. The trigger assembly of claim 12, further comprising a cover mounted on the elastomer member, wherein the maximum length of the trigger assembly along the axis of movement is at most 10 mm and the plurality of conductive tracks is configured to sense at least four speed steps.

15. The trigger assembly of claim 12, wherein the non-planar surface includes a conductive central region, a conductive peripheral region, and an insulative region positioned between the conductive central region and the conductive peripheral region.

* * * * *